Figure 1:
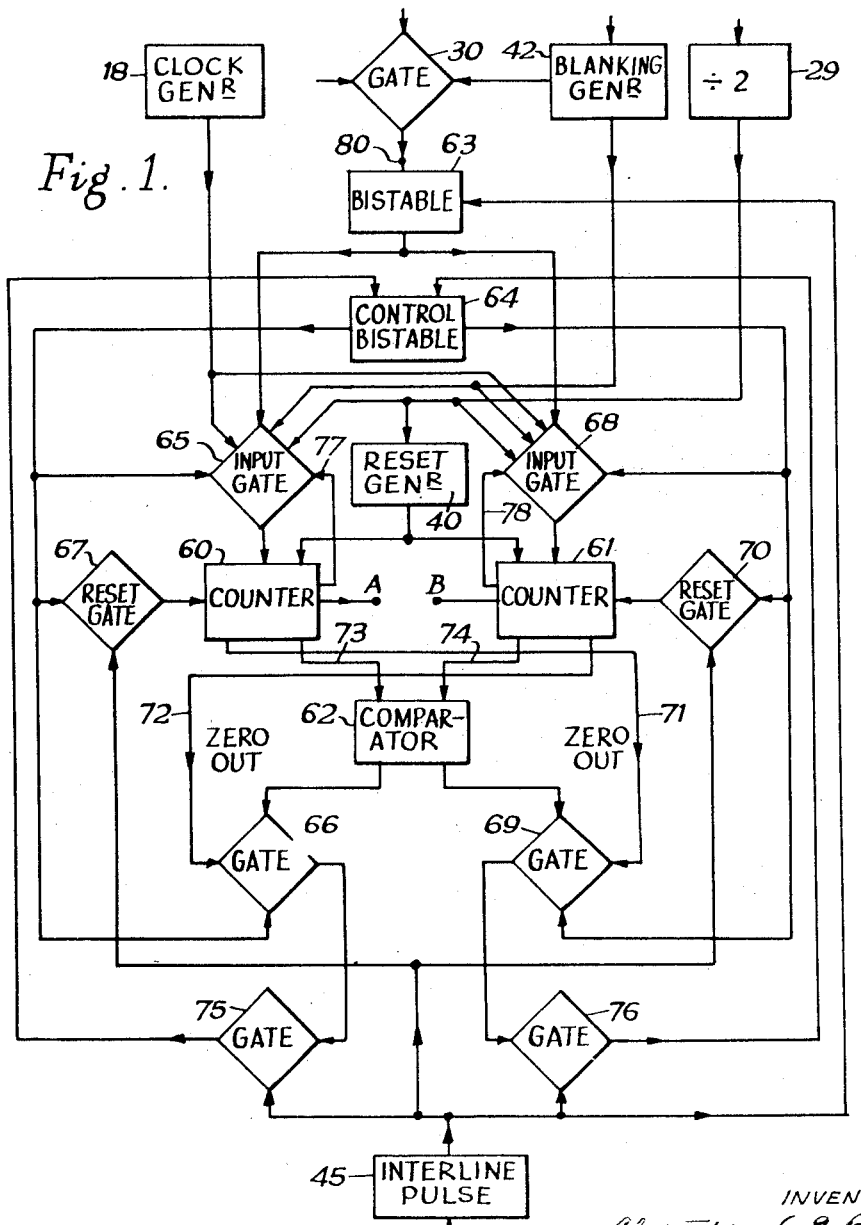

United States Patent Office 2,949,228
Patented Aug. 16, 1960

2,949,228

CIRCUITS EMBODYING ELECTRONIC COUNTERS

Christopher Edmund Gervase Bailey, London, George Ogilvie Norrie, Seamans Green, and John Hugh Smith, Send, England, assignors to The Solartron Electronic Group Limited Filed Mar. 20, 1958, Ser. No. 722,732

Claims priority, application Great Britain Mar. 25, 1957

2 Claims. (Cl. 235—92)

The present invention relates to circuits embodying electronic counters.

For some purposes it is desired to indicate or record maximum or minimum values. An example is apparatus for reading symbols in which, in order to secure proper registration of each symbol in relation to a scanning raster, the minimum distances of the symbol from the edges of the raster in the direction of line scanning are determined and a correction is applied in dependence upon the difference between these distances. Such apparatus is described and claimed in our patent application Serial No. 648,235.

Another example is the determination of the maximum or minimum values of a graph representing variations of some function, for instance the successive peaks of a spectrum in an optical, mass, or X-ray spectrometer.

The present invention has for its principal object to provide apparatus whereby such maximum or minimum values can be obtained in a convenient manner and at a high speed.

According to the present invention there is provided apparatus adapted to be fed with a succession of groups of pulses and to produce a voltage or set of voltages dependent upon the maximum or minimum number of pulses in any one group, the apparatus comprising two electronic counters each having, or being adapted to have, the said pulses applied thereto, and each adapted, when activated, to count the number of such pulses applied thereto and to generate and store a voltage or set of voltages representative of such number, a comparator for comparing the voltages or set of voltages stored by the two counters, and adapted after each group of pulses to reset and thereafter activate that one of the two counters storing the voltage or set of voltages representative of the higher or lower count.

In the case of symbol or graph reading, as hereinbefore referred to, the symbol or graph may be scanned along parallel lines and the said pulses may be generated by a source of clock pulses whose frequency is a suitable multiple of the line scanning frequency. Each said group of pulses may then be the number of clock pulses occurring before the first traversal of a symbol or graph or after the last such traversal. The traversals may be determined photoelectrically or otherwise.

The invention will be described, by way of example, as applied to symbol registration hereinbefore referred to, the particular apparatus to be described with reference to the accompanying drawings, being also described in the specification of our previously mentioned application Serial No. 648,235.

Figure 2:
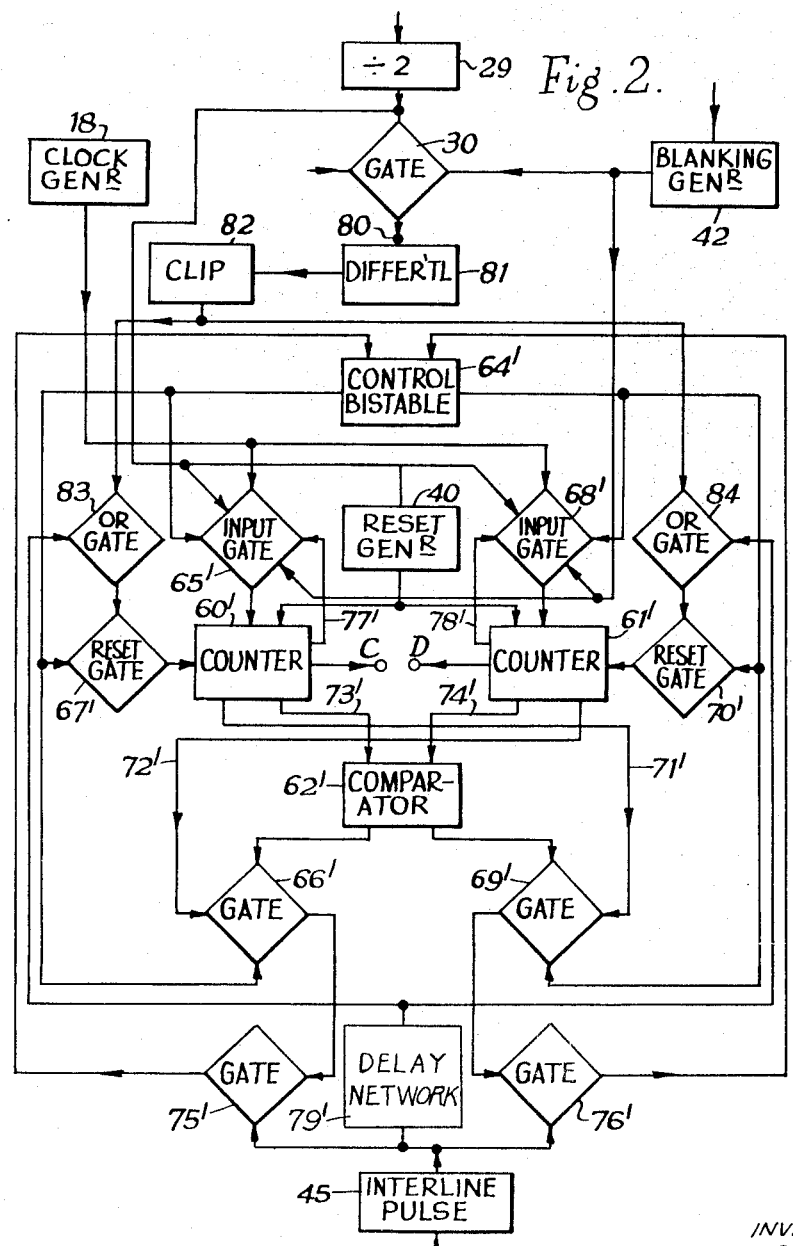
Figure 3:
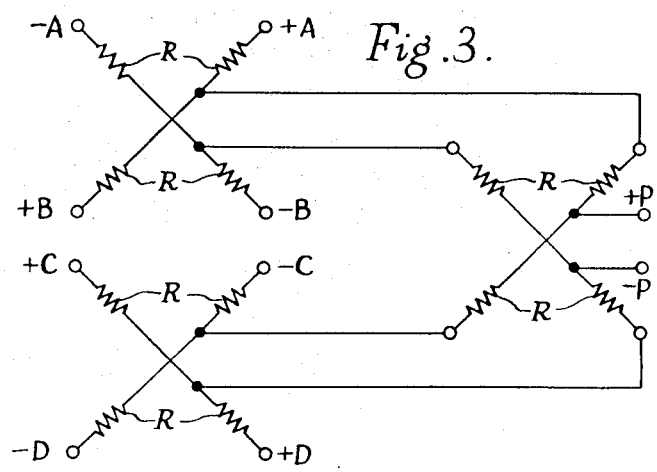

In the drawings,

Fig. 1 is a block circuit diagram of an arrangement according to the invention for determining the minimum distance of a symbol from the starting edge of a scanning raster in the direction of line scanning, Fig. 2 is a modification of the arrangement of Fig. 1 for determining the minimum distance of a symbol from the finishing edge of the scanning raster (or, what is the same thing, the maximum distance of the symbol from the starting edge), and Fig. 3 is a circuit that may be used to combine the outputs of Figs. 1 and 2.

Further details of apparatus associated with that disclosed in Figs. 1 and 2 may be obtained from the hereinbefore mentioned specification Serial No. 648,235. For the purposes of the present description it is sufficient to say the following. Each symbol is scanned twice. During the first of each such pair of scans, referred to as the plot scan, voltages are generated dependent upon the position of the symbol relative to the scanning raster and these voltages are used during the second scan of each pair, referred to as the read scan, to bias the deflecting means by which scanning is effected in such a manner as to locate the scanning raster symmetrically with respect to the symbol. It is during the read scan that reading of the symbol is effected. The symbol is scanned in what will be called the north to south direction. A circuit 29, dividing the frame scanning frequency by two, supplies a square waveform which conditions gates 65 and 68 to open only during alternate frame periods, namely the plot scan periods, both gates being capable of opening during such periods and incapable of being opened during the alternate periods. In addition, the circuit 29 controls a generator 40 to reset counters 60, 61 to zero before the beginning of each plot scan. A blanking pulse generator 42 inhibits the gates 65 and 68 during flyback of the line scan waveform. A gate circuit 30 supplies to a terminal 80 a pulse at each traverse of the symbol. A clock pulse generator 18 generates pulses at a multiple of the line scanning frequency, and an interline pulse generator 45 generates pulses at the line frequency between successive scanning lines. A control bi-stable 64 conditions one of the input gates 65, 68 to open and inhibits the other from opening and correspondingly inhibits from opening and conditions to open respectively end-of-line reset gates 67, 70 and comparator gates 66, 69.

The operation of the circuit of Fig. 1 may be briefly described as follows. Each line is divided into elements by clock pulses from 18. One counter, say 60, is arranged to count the number of such elements scanned before the first black in the first line and the other counter 61 is arranged to count the corresponding number of elements in the second line. These counts are then compared in a comparator 62 and the output of the comparator is arranged to ensure that that one of the counters 60 and 61 which holds the higher count is reset and the third line is then counted into it. This process is repeated until the end of the plot scan when the output is read out from the counter holding the lower count. Thus the output represents the number of white or blank elements north of the most northerly black element of the symbol.

Counters 60 and 61 are scale-of-two counters comprising four counters in cascade for example as shown in U.S. patent to Rench, 2,697,551. The outputs may be taken as disclosed in U.S. patent to Heising, 2,539,623, for the counters 54, 56, 58 through potentiometers 92, 102 and 142 and applied to the grid of tube 40 for comparison with an input signal at 36. This input signal would in Figure 1 of the present application be the output of the other counter. The comparator 62 is a long-tailed pair and may be as disclosed at 18 in Patent 2,539,623 or at 430 in Patent 2,697,551.

The way in which the circuit of Fig. 1 operates is as follows: The gate circuit 30 has its output terminal 80 connected to apply "black" pulses to a bi-stable device 63 which is reset at the end of each line scan by an interline pulse from 45.

Assume that before the beginning of a plot scan the control bi-stable device 64 is in a condition such that input gate 65, comparator gate 66, and reset gate 67 are conditioned to open. Gates 68, 69 and 70 corresponding to 65, 66 and 67 respectively are not so conditioned to open and are thus inhibited from opening. Both counters 60 and 61 have at this time been reset to zero by the action of the reset-generator 40. The clock pulse generator 18 may, for example, generate 35 pulses per line and these are applied through the input gate 65 to the counter 60 which proceeds to count these pulses.

The counters 60 and 61 each have four outputs. Outputs 71 and 72 are coupled to gates 69 and 66 respectively and ensure during the first line of the plot scan that the unused counter (assumed to be 61) inhibits the comparator gate 66 which would otherwise be conditioned to open by the action of the control bi-stable 64. Similarly, if counting is arranged to start with the counter 61, the counter 60, which is then the unused counter, inhibits the comparator gate 69. The outputs 73 and 74 of the counters apply to the comparator 62 a voltage dependent upon the number of pulses counted. This voltage rises in approximately equal steps for each pulse counted and in the present example each counter may be arranged to count up to a total of 15. The other two counter outputs A and 77 for 60 and B and 78 for 61 will be referred to hereinafter.

When a black signal arrives at the bi-stable device 63, the condition of this device is changed and it then inhibits the input gate 65, thereby stopping the application of clock pulses to the counter 60. This counter applies to comparator 62 by output 73 a voltage corresponding to the number of pulses it has counted. In the comparator 62 this voltage is compared with that from the counter 61 which at that time is zero.

The comparator gate 69 is, as already stated, inhibited by the bi-stable device 64, and it is also inhibited by the state of the comparator 62. The comparator gate 66 is now inhibited by the zero count of the counter 61 by lead 72. Consequently no inhibition is passed by the gates 66 and 69 to either of two further gates 75 and 76, and the next interline pulse from 45 therefore passes through these gates 75 and 76 and changes the state of the control bi-stable device 64.

On the next line, therefore, the input and reset gates 65 and 67 and the comparator gate 66 are inhibited while the corresponding gates 68, 69 and 70 are conditioned to open. The next count of blank elements is thus made by the counter 61. The zero outputs on leads 71 and 72 are no longer operative since both counters have changed from their zero state. The counter 61 proceeds to count until the first black pulse in the second line changes the state of the bi-stable device 63.

It will first be assumed that the second line count stored in the counter 61 is higher than the first line count stored in the counter 60. The comparator gate 69, now not being inhibited by a zero count from the counter 60 by lead 71, is then opened by the voltage from the comparator 62. Opening of the gate 69 inhibits the gate 76 and the effect of this is that the state of the bi-stable device 64 is not changed when the next interline pulse occurs. The counter 61, that is the counter with the higher count, is then reset by the interline pulse passing the gate 70 and on the scanning of the third line, the states of the gates 65 to 70 being unaltered, the count is again accumulated on the counter 61.

If the second line count stored in the counter 61 is less than that stored in the counter 60, the procedure is as follows. The comparator gate 66 then receives the "opening" output from the comparator 62 instead of the gate 69. Opening of the gate 66 is, however, inhibited by the state of the bi-stable device 64. Thus there is no inhibition of the gates 75 and 76 and therefore the next interline pulse changes over the control bi-stable device 64. In order to insure that the counter 61 with the lower count is not reset while the counter 60 with the higher count is reset and counts the clock pulses during the next line scan, the change-over of the control bi-stable 64 must be arranged to take place before reset is effected, since counter 60 and not counter 61 is to be reset. The interline pulse applied to the reset gates 67, 70 must therefore be delayed until the control bi-stable 64 has been operated in order to condition gate 67 to open and inhibit gate 70. A delay network 79 provides the required delay.

An output dependent upon the number of pulses counted appears at the output terminals A and B, the voltage at one of these always being zero when each line scan is completed.

In order to ensure that the processes described take place in the correct sequence, the time constants of opening and closing of the comparator gates 66 and 69 are made larger than those of the gates 75 and 76.

The counters 60 and 61 have output connections 77 and 78 connected to the input gates 65 and 68 respectively and serving to inhibit these gates, and prevent further clock pulses from passing, when the count has reached, say, 15. This connection is not essential but it enables the structure of the counters 60 and 61 and of the comparator 62 to be simplified. The limiting of the capacity of the counters is based upon the reasonable assumption that in no complete plot scan will a black element be absent throughout the upper half of the scan.

When the plot scan has been completed, the voltage at one of the outputs A or B of the counters will be at zero and that at the other will represent the smallest number of blank elements counted in any line, that is to say the number of blank elements separating the most northerly point on the symbol from the north of the scanning raster.

All the gates are AND gates, the input gates 65 and 68 and the comparator gates 69 and 66 differing from simple AND gates in that inhibiting pulses are sometimes applied to them. This inhibition is applied from the blanking generator 42 during line flyback to input gates 65, 68, the zero outputs from 60 to 61 maintain inhibition on the comparator gates 69, 66 when the respective counter is at zero. The design of AND gates is well known but reference may be made to "Digital Computer Components and Circuits," by R. K. Richards, published by D. Van Nostrand, November 1957.

A circuit similar to that of Fig. 1 for determining the number of blank elements between the most southerly point on the symbol and the south of the raster will be described with reference to Fig. 2. This circuit is distinguished from that of Fig. 1 by the following: the bi-stable device 63 is replaced by a differentiating network 81 and a clipping circuit 82, and two additional gates 83 and 84, which are "or" gates, are added. Identical parts in Figs. 1 and 2 have the same reference. Separate but corresponding parts in Figs. 1 and 2 are given the same reference, those in Fig. 2 being given a dash superscript.

The differentiating network 81 generates pulses from the transitions from black to white and white to black in the signals at the terminal 80. The clipping circuit selects from these pulses those corresponding to transitions from black to white. These pulses are applied to the "or" gates 83 and 84. Whenever a transition black-to-white pulse or an interline pulse occurs, therefore, this pulse is passed to the reset gates 67' and 70' and that one of the reset gates which is not inhibited by the control bi-stable device 64' operates to reset its associated counter 60' or 61'. It will be noted that the counter which is operative during any line scan will be reset at each transition from black to white and consequently the count stored at the end of the line scan will represent the number of blank elements between the most southerly black element in the line and the southern end of the line.

At the end of a plot scan one of the output terminals

C or D will be at zero voltage and the other will be at a voltage representative of the distance between the most southerly point on the symbol and the southern boundary of the raster.

Blanking and plot pulses from 42 and 29 respectively are preferably applied to the input gates 65, 65' and 68, 68' in both Figures 1 and 2, as shown in order to ensure that the counters 60, 60' and 61, 61' operate only during the desired time intervals.

It is desirable that the outputs from the counters 60, 61 and 60', 61' should be in push-pull and that push-pull connections should be retained up to the deflecting coil.

One circuit for combining the outputs of Figs. 1 and 2, when these outputs are in push-pull, is shown in Fig. 3. The outputs of counter 60 are +A and —A, those of counter 61 are +B and —B, those of counter 60' +C and —C, and those of counter 61' +D and —D. These outputs are interconnected as shown by networks of equal resistors R and the combined output is taken at +P and —P and fed for example to the deflecting coil of a cathode ray tube when the scanning is performed by such a tube. The output is applied to control the mid position of the beam in a north-to-south direction. The output +P and —P is preferably applied through a preset variable gain amplifier.

The way in which the circuit of Fig. 1 or Fig. 2 can be applied to generating a voltage dependent upon the maximum or minimum of a graph will be understood by those skilled in the art.

The invention is not, however, limited to cases where the pulses to be counted are controlled electro-optically or by scanning. For instance the invention may be applied to determining the maximum or minimum amplitude of pulses. Such pulses may, for example, be derived from any waveform by quantising that waveform. Each pulse may be converted into a group of successive derived pulses, the number of the derived pulses in each group being proportional to the amplitude of the corresponding original pulse. These derived pulses may then be used instead of the clock pulses in Fig. 1. The parts 30, 42, 29 and 63 may be omitted and the interline pulse generator 45 is replaced by a pulse generator generating a pulse between each group.

One way in which pulses of varying amplitude may be converted into the aforesaid groups is as follows. If the original pulses of varying amplitude are not of constant width they are converted in known manner into constant width pulses. Each of these pulses is applied to charge a capacitor which discharges through a resistor. The time of discharge is, therefore, dependent upon the amplitude of the pulse. The voltage across the resistor is applied to a pulse generator arranged to generate pulses at a predetermined frequency so long as a voltage of above a predetermined value exists across the resistor. The number of pulses generated in response to each discharge of the capacitor is then dependent upon the voltage to which the capacitor was charged and hence to the amplitude of the original pulse.

If desired the output obtained in accordance with the invention in any of its forms may be recorded. Moreover, if desired, the output may be applied to give an indication whenever the maximum or minimum value exceeds or falls below, respectively, a predetermined value.

Furthermore instead of deriving a single voltage by means of the network of resistors R, a set of voltages may be taken from the internal circuits of that counter containing a non-zero count. Such a set of voltages may be more suitable than a single voltage for recording the output on magnetic tape, or operating an automatic printer.

We claim:

1. Apparatus for generating from a succession of groups of pulses a voltage dependent upon the maximum or minimum number of pulses in any one group of the succession, said apparatus comprising an input terminal for the application of the said groups of pulses, two electronic counters each generating a count voltage dependent upon the number of pulses applied thereto, an input gate coupled between said terminal and each of said counters, a comparator coupled to said counters and having two output terminals, control means having two stable conditions, means coupling said control means to each of said input gates to permit one input gate to open and inhibit the other input gate in one condition and to permit the said other input gate to open and inhibit said one input gate in the other condition, means coupling said comparator output terminals to said control means to change the condition of said control means in response to a predetermined voltage relation at said output terminals, and reset means coupled to each said counter and to said control means and permitting resetting of one counter in one of said stable conditions and permitting resetting of the other counter in the other of said stable conditions.

2. Apparatus according to claim 1 comprising a clock pulse generator coupled to said input terminal, sources of starting and stopping pulses coupled to said input gates and respectively removing inhibition from and inhibiting each said gate.

References Cited in the file of this patent

UNITED STATES PATENTS

| | | |
|---|---|---|
| 2,539,623 | Heising | Jan. 30, 1951 |
| 2,697,551 | Rench | Dec. 21, 1954 |